US008914885B2

(12) United States Patent
Greenwald et al.

(10) Patent No.: US 8,914,885 B2
(45) Date of Patent: Dec. 16, 2014

(54) METHODS AND APPARATUS FOR DELIVERING CONTROL MESSAGES DURING A MALICIOUS ATTACK IN ONE OR MORE PACKET NETWORKS

(75) Inventors: Michael B. Greenwald, West Orange, NJ (US); Eric H Grosse, Berkeley Heights, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 992 days.

(21) Appl. No.: 11/592,726

(22) Filed: Nov. 3, 2006

(65) Prior Publication Data

US 2008/0109891 A1     May 8, 2008

(51) Int. Cl.
*H04L 29/06*     (2006.01)
*G06F 21/00*     (2013.01)
*H04L 12/801*     (2013.01)

(52) U.S. Cl.
CPC ........... *H04L 63/1458* (2013.01); *H04L 63/101* (2013.01); *H04L 47/12* (2013.01); *H04L 63/0263* (2013.01); *H04L 63/0236* (2013.01); *H04L 2463/141* (2013.01)
USPC .......................................................... 726/23

(58) Field of Classification Search
CPC ....................... H04L 63/1408; H04L 63/0227
USPC .............................................. 726/22, 23, 24
See application file for complete search history.

(56) References Cited

U.S. PATENT DOCUMENTS

| 6,111,894 | A * | 8/2000 | Bender et al. | 370/469 |
|---|---|---|---|---|
| 6,711,166 | B1 * | 3/2004 | Amir et al. | 370/395.1 |
| 8,479,282 | B2 | 7/2013 | Hamada | |
| 2003/0061353 | A1 * | 3/2003 | Johnson et al. | 709/226 |
| 2004/0243349 | A1 * | 12/2004 | Greifeneder et al. | 702/183 |
| 2006/0185008 | A1 * | 8/2006 | Le et al. | 726/11 |

(Continued)

FOREIGN PATENT DOCUMENTS

| JP | 2004247955 | 2/2004 |
|---|---|---|
| JP | 2004260789 | 9/2004 |

(Continued)

OTHER PUBLICATIONS

Wood et al. "Denial of Service Attacks in Sensor Networks" Computer, col. 35 No. 10 pp. 54-62.*

(Continued)

*Primary Examiner* — Lisa Lewis
(74) *Attorney, Agent, or Firm* — Ryan, Mason & Lewis, LLP

(57) ABSTRACT

Methods and apparatus are provided for reliably delivering control messages to a central filter, for example, during a malicious attack, in one or more packet networks without requiring responses or acknowledgements from the central filter to the detector. A detector defends against unwanted traffic by a target victim by determining that unwanted traffic is received by the target victim based on an analysis of packets received from one or more source IP addresses; and transmitting a denunciation message to a central filter associated with a service provider, the denunciation message identifying a source address of at least one source computing device whose transmission of packets to the target victim is to be one or more of limited, dropped or allowed and wherein the denunciation message is transmitted using a Denunciation Protocol that does not require a prompt acknowledgement from the central filter. In addition, the denunciation messages can be sent redundantly to the central filter and are preferably self contained.

24 Claims, 6 Drawing Sheets

(56) References Cited

U.S. PATENT DOCUMENTS

| | | | |
|---|---|---|---|
| 2006/0218636 A1* | 9/2006 | Chaum | 726/22 |
| 2006/0248588 A1* | 11/2006 | Jayaraman | 726/22 |
| 2007/0033650 A1 | 2/2007 | Grosse | |
| 2007/0127506 A1* | 6/2007 | Absillis | 370/401 |
| 2007/0174614 A1* | 7/2007 | Duane et al. | 713/168 |
| 2008/0089433 A1* | 4/2008 | Cho et al. | 375/267 |

FOREIGN PATENT DOCUMENTS

| | | |
|---|---|---|
| JP | 2005159922 | 6/2005 |
| JP | 2006270894 | 5/2006 |
| WO | 2006040880 | 4/2006 |

OTHER PUBLICATIONS

Mills. "RFC957 Experiments in Network Clock Synchronization". Sep. 1985. pp. 1-22.*
Postel, J., "Internet Control Message Protocol", Internet Citation [online] XP002238199 retrieved from the Internet: URL:ftp://ftp.isi.edu/in-notes/rfc792.txt>, pp. 1-4, Apr. 14, 2003.
E. Grosse, "Method and Apparatus for Defending Against Denial of Service Attacks in IP Networks Based on Specified Source/Destination IP Address Pairs," U.S. Appl. No. 11/197,841, filed Aug. 5, 2005.
Grosse et al., "Method and Apparatus for Defending Against Denial of Service Attacks in IP Networks by Target Victim Self-Identification and Control," U.S. Appl. No. 11/197,842, filed Aug. 5, 2005.

* cited by examiner

FIG. 6

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| DP PORT NUMBER | | | | | | | | | | | | | | | | #OF UNITS SINCE RSTART | | | | | | | | | | | | | | | |
| NONCE [0] | | | | | | | | | | | | | | | | | | | | | | | | | | | | | | | |
| NONCE [1] | | | | | | | | | | | | | | | | | | | | | | | | | | | | | | | |
| NONCE [2] | | | | | | | | | | | | | | | | | | | | | | | | | | | | | | | |
| NONCE [3] | | | | | | | | | | | | | | | | | | | | | | | | | | | | | | | |
| NONCE [4] | | | | | | | | | | | | | | | | | | | | | | | | | | | | | | | |

# METHODS AND APPARATUS FOR DELIVERING CONTROL MESSAGES DURING A MALICIOUS ATTACK IN ONE OR MORE PACKET NETWORKS

CROSS-REFERENCE TO RELATED APPLICATION

The present application is related to U.S. patent application Ser. No. 11/197,842, entitled "Method and Apparatus for Defending Against Denial of Service Attacks in IP Networks by Target Victim Self-Identification and Control," and U.S. patent application Ser. No. 11/197,841, entitled "Method and Apparatus for Defending Against Denial of Service Attacks in IP Networks Based on Specified Source/Destination IP Address Pairs," each filed Aug. 5, 2005, assigned to the assignee of the present invention and incorporated by reference herein.

FIELD OF THE INVENTION

The present invention relates to computer security techniques for packet-based communications networks, and more particularly, to methods and apparatus for detecting and denouncing unwanted traffic, such as a Denial of Service attack or another malicious attack, in such packet-based networks.

BACKGROUND OF THE INVENTION

Malicious attacks, such as Denial-of-service (DoS) attacks, attempt to make computer resources unavailable to their intended users. For example, a DoS attack against a web server often causes the hosted web pages to be unavailable. DoS attacks can cause significant service disruptions when limited resources need to be allocated to the attackers instead of to legitimate users. The attacking machines typically inflict damage by sending a large number of Internet Protocol (IP) packets across the Internet, directed to the target victim of the attack. For example, a DoS attack can comprise attempts to "flood" a network, thereby preventing legitimate network traffic, or to disrupt a server by sending more requests than the server can handle, thereby preventing access to one or more services.

A number of techniques have been proposed or suggested for defending against such malicious attacks. For example, U.S. patent application Ser. No. 11/197,842, entitled "Method and Apparatus for Defending Against Denial of Service Attacks in IP Networks by Target Victim Self-Identification and Control," and U.S. patent application Ser. No. 11/197,841, entitled "Method and Apparatus for Defending Against Denial of Service Attacks in IP Networks Based on Specified Source/Destination IP Address Pairs," disclose techniques for detecting and denouncing DoS attacks.

Systems that defend against such malicious attacks typically employ a detector associated with the customer network and a central filter in the network of the service provider to protect the customer network against malicious attacks. Generally, the detector will detect a malicious attack against the customer network and will send one or more denunciation or notification messages to the central filter. For example, upon determining that a malicious attack is being perpetrated on the customer network, the detector may transmit one or more source/destination IP address pairs to the central filter, which causes the service provider to limit the transmission of IP packets whose source IP address and destination IP address match those of any of the transmitted source/destination IP address pairs, thereby limiting (or eliminating) the malicious attack. The detector is typically located close to the customer network.

The malicious attack, however, typically leads to such heavy packet loss that the control messages from the central filter to the detector are likely to be lost or long delayed. In addition, the detector is likely to be busy and under a heavy load during a malicious attack. Existing systems that defend against such malicious attacks typically employ Transport Layer Security (TLS), Secure Socket Layer (SSL), a Secure Shell (SSH) or another Transmission Control Protocol (TCP) based protocols requiring an acknowledgement for sending control messages to the central filter. Such channels are typically sufficient, except during a malicious attack. During a malicious attack, the acknowledgement from the central filter may not be received by the detector, or may arrive at the detector at a time when the input buffers of the detector are overloaded. Generally, the detector cannot continue processing until all prior denunciation messages are properly acknowledged by the central filter.

A need therefore exists for methods and apparatus for reliably delivering control messages to the central filter during a malicious attack in one or more packet networks without requiring responses from the central filter to the detector.

SUMMARY OF THE INVENTION

Generally, methods and apparatus are provided for reliably delivering control messages to a central filter, for example, during a malicious attack, in one or more packet networks without requiring responses or acknowledgements from the central filter to the detector. According to one aspect of the invention, a detector defends against unwanted traffic by a target victim by determining that unwanted traffic is received by the target victim based on an analysis of packets received from one or more source IP addresses; and transmitting a denunciation message to a central filter associated with a service provider, the denunciation message identifying a source address of at least one source computing device whose transmission of packets to the target victim is to be one or more of limited, dropped or allowed and wherein the denunciation message is transmitted using a Denunciation Protocol that does not require a prompt acknowledgement from the central filter.

According to further aspects of the invention, the denunciation messages can be sent redundantly to the central filter and are preferably self contained. The central filter and detectors share state information, and optionally maintain any changes to the state information.

According to a further aspect of the invention, the disclosed Denunciation Protocol includes one or more features to avoid a malicious attack aimed at the Denunciation Protocol itself. For example, the denunciation message optionally includes a sequence number that (i) allows conflicting denunciation messages from a plurality of the target victims to be reconciled; (ii) allows a malicious attack aimed at the Denunciation Protocol to be avoided; and (iii) allows duplicate copies of the denunciation message to be discarded.

A more complete understanding of the present invention, as well as further features and advantages of the present invention, will be obtained by reference to the following detailed description and drawings.

BRIEF DESCRIPTION OF THE DRAWINGS

FIG. 6 illustrates an HMAC key for UDP requests, prepended to the UDP packet.

DETAILED DESCRIPTION

The present invention provides methods and apparatus for reliably delivering control messages to a central filter during a malicious attack in one or more packet networks. According to one aspect of the present invention, a Denunciation Protocol is provided for communications between a detector at the customer network and a central filter at the network of the service provider. In one exemplary implementation, the Denunciation Protocol comprises a pair of communication channels. A first communication channel is a reliable, secure authenticated stream, such as a TLS channel. The second communication channel can be an unreliable authenticated non-stream protocol on top of, for example, UDP, that uses the secure channel to bootstrap authentication. For example, a User Datagram Protocol (UDP) can be employed to avoid the immediate acknowledgement that is required with conventional techniques that employ TCP-based protocols. In this manner, if there is heavy packet loss in the return path from the central filter to the detector, for example, due to a malicious attack, where the central filter acknowledgements would tend to be lost, the desired protection can still be achieved. In addition, redundant transmission of the control messages on the forward path from the detector to the central filter is used to overcome moderate packet loss on the forward path. Generally, it is preferable to send a number of redundant packets from the detector to the central filter, than to send any packets from the central filter to the detector during an attack.

Figure 1:
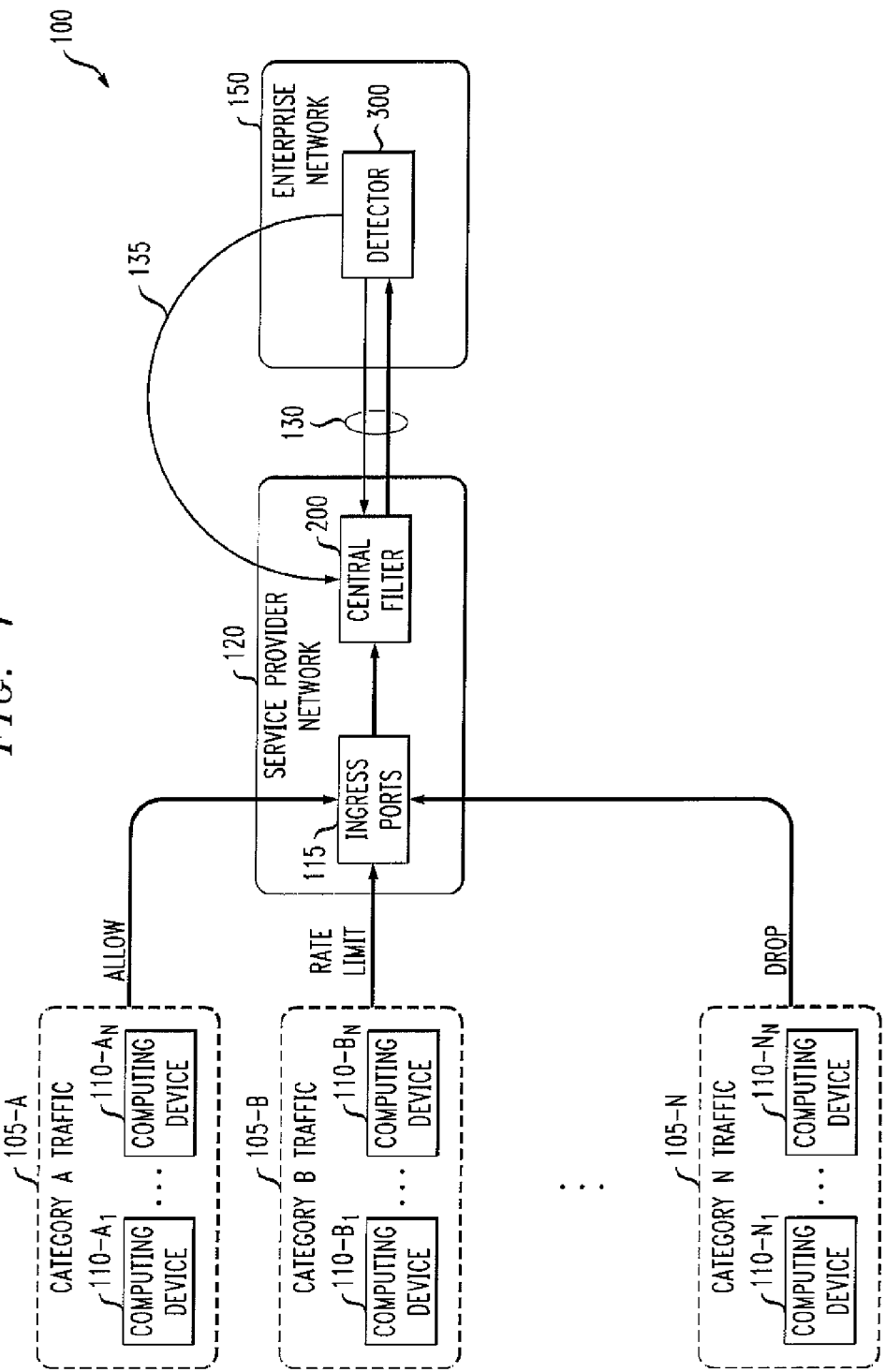
FIG. 1 illustrates a network environment in which the present invention may operate.

FIG. 1 illustrates a network environment 100 in which the present invention may operate. As shown in FIG. 1, an enterprise network 150 protects itself against malicious attacks using a detector 300, as discussed further below in conjunction with FIG. 3. The enterprise network 150 allows enterprise users to access the Internet or another network by means of a service provider network 120. The service provider network 120 provides service to users of the enterprise network 150, and receives packets from various sources by means of ingress ports 115 and transmits them to the indicated destination in the enterprise network 150.

In one exemplary embodiment, the detector 300 cooperates with a central filter 200, discussed further below in conjunction with FIG. 2, to protect itself against malicious attacks. Generally, as discussed further below, the detector 300 will detect a malicious attack, such as a Denial of Service attack, against the enterprise network 150 and will notify the central filter 200 maintained by the service provider.

The central filter 200 serves to limit the traffic that reaches the enterprise network 150 by means of the service provider network 120. The detector 300 typically sits behind the firewall in the enterprise network 150 and the detector 300 typically sends denunciation messages to the central filter 200 of the ISP. The detector 300 and central filter 200 may be implemented based on U.S. patent application Ser. No. 11/197,842, entitled "Method and Apparatus for Defending Against Denial of Service Attacks in IP Networks by Target Victim Self-Identification and Control," and U.S. patent application Ser. No. 11/197,841, entitled "Method and Apparatus for Defending Against Denial of Service Attacks in IP Networks Based on Specified Source/Destination IP Address Pairs," as modified herein to provide the features and functions of the present invention.

The detector 300, upon determining that a Denial of Service attack is being perpetrated on the enterprise network 150, transmits one or more source/destination IP address pairs to the central filter 200, which causes the service provider network 120 to limit (e.g., block or rate limit) the transmission of IP packets whose source IP address and destination IP address match those of any of the transmitted source/destination IP address pairs, thereby limiting (or eliminating) the Denial of Service attack from one or more source devices 110 to the attack victim within the enterprise network 150. The detector 300 optionally transmits the source/destination IP address pairs with use of an unreliable UDP connection 135 or the primary secure authenticated connection 130. According to one aspect of the present invention, a Denunciation Protocol is provided for communications between the detector 300 and the central filter 200.

The victim of a Denial of Service attack can thus "push back" by denouncing attackers to its service provider, which will, in response, update a table of source/destination IP address pairs that are to be blocked. More specifically, upon recognizing that an attack is taking place, the victim (enterprise network 150) will identify one or more pairs of source and destination IP addresses that are specified in packets deemed to be a part of the attack, and communicate those IP address pairs to the service provider for blocking by the central filter 200.

As shown in FIG. 1, packets destined to the subscriber (enterprise network 150) is classified into classes, generally corresponding to "good" and "bad" traffic. For example, good traffic from Category A 105-A is delivered (allowed) and bad traffic from Category B 105-B and Category N 105-N is rate-limited or dropped, respectively. Source computing devices 110 that send traffic to a destination address associated with the enterprise network 150 are classified into one of the N exemplary categories. Denunciations shift the boundary between good and bad traffic.

Note that, in accordance with certain illustrative embodiments, the attacker (i.e., the identified source IP address or addresses) need not be cut off completely from the network, but rather is prohibited only from sending packets to the victim (i.e., the identified destination IP address or addresses). This may be advantageous, particularly in the case where the identified source IP address or addresses represent a legitimate user which has been taken over (e.g., a zombie) for the given attack against the victim and related machines. Thus, the owner of the machine that was taken over may continue to use the system for legitimate purposes, while the attack being perpetrated on the victim (possibly unbeknownst to the legitimate user) is nonetheless advantageously thwarted. Moreover, note that the technique in accordance with such illustrative embodiments also advantageously provides protection from overly zealous identification of attackers by a given victim. Since, in accordance with the principles of the present invention, the identification of an attack is left to the discretion of the apparent victim, it is clearly advantageous that only traffic to the given victim is being cut off or restricted.

A malicious attack may be recognized by the victim by one or more algorithms of varying degrees of simplicity or sophistication, which are outside the scope of the present invention, but many of which will be obvious to those skilled in the art.

For example, in accordance with one illustrative embodiment of the invention, packet traces may be examined and an attack may be identified based solely on the presence of very high traffic levels (e.g., high packet rates) from either a single identified source or a plurality of identified sources. It is noted that this is one conventional method of identifying the presence of a Denial of Service attack and will be familiar to those of ordinary skill in the art.

In other implementations, however, application based analysis of packet contents and application logs may be performed to identify packets, sequences of packets or actions having a suspicious nature, such as, for example, recognizing that there have been frequent database searches for non-existent database elements; recognizing that there have been multiple requests apparently from a human being which occur at a higher rate than a person could initiate them; identifying syntactically invalid requests; and identifying suspicious amounts of traffic at particularly sensitive times in the operation of a normally occurring activity. An example of the latter class of suspicious packets might be identified, for example, if a stock trading web site notices particularly disruptive traffic at a sensitive time during an imminent stock transaction. In further variations, a number of different indicia of a possible attack, which may include, for example, one or more of the above described situations, may be advantageously combined in a more sophisticated analysis to identify the presence of an attack.

The exemplary detection system can operate in one of two modes. When the zone is in a "default-drop" mode, the default behavior is to filter all traffic destined for the zone except traffic explicitly listed on the default-drop. Generally, in a default-drop mode, the filter will automatically drop all traffic unless explicitly authorized (for example, matching a predefined allow filter). When the zone is in default-allow mode, on the other hand, all traffic to the subscriber is passed by the filter, except that traffic that explicitly matches a predefined drop filter.

Figure 2:
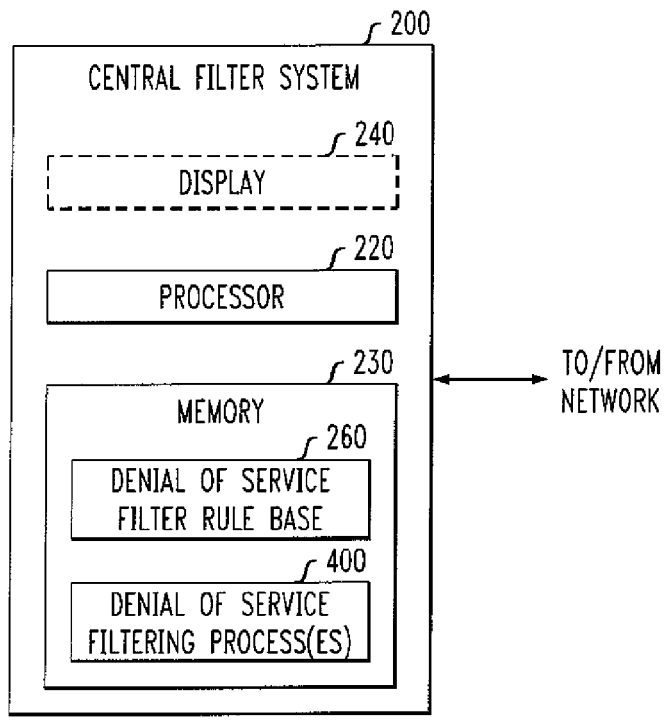
FIG. 2 is a schematic block diagram of the central filter system of FIG. 1.

FIG. 2 is a schematic block diagram of the central filter system 200 of FIG. 1 that can implement the processes of the present invention. As shown in FIG. 2, memory 230 configures the processor 220 to implement the denial of service filtering methods, steps, and functions disclosed herein. The memory 230 could be distributed or local and the processor 220 could be distributed or singular. The memory 230 could be implemented as an electrical, magnetic or optical memory, or any combination of these or other types of storage devices. It should be noted that each distributed processor that makes up processor 220 generally contains its own addressable memory space. It should also be noted that some or all of computer system 200 can be incorporated into an application-specific or general-use integrated circuit.

As shown in FIG. 2, the exemplary memory 230 includes a denial of service filter rule base 260 and one or more denial of service filtering processes 400, discussed further below in conjunction with FIG. 4. Generally, the exemplary denial of service filter rule base 260 is a conventional filter base containing source/destination address pairs associated with traffic that should be limited or allowed by the central filter 200. The denial of service filtering process 400 is an exemplary method for defending against Denial of Service or other attacks in accordance with the present invention.

The central filter 200 may be implemented as a stand-alone box included in the service provider network 120, or, alternatively, as a line card incorporated into otherwise conventional network elements that are already present in the network 120. Moreover, in accordance with certain illustrative embodiments, the central filter 200 may be advantageously deployed by the carrier within the network 120 at a location relatively close to the attack origins, or it may be initially placed to advantageously defend premium customers from attack.

Figure 3:
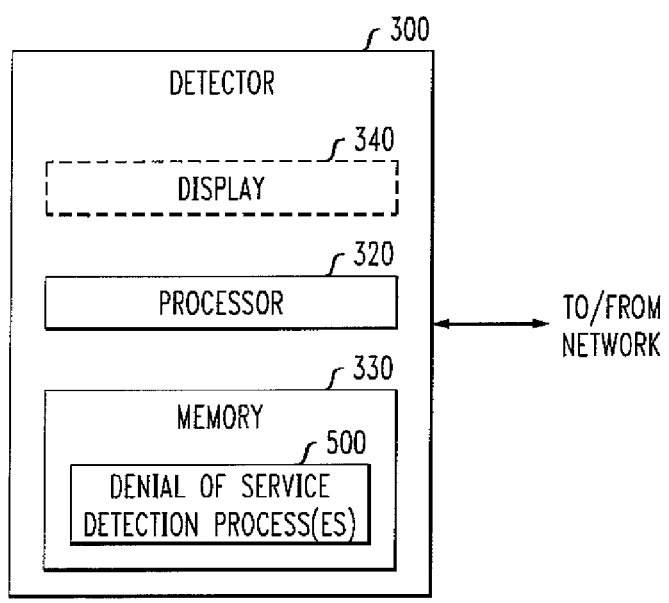
FIG. 3 is a schematic block diagram of the detector of FIG. 1.

FIG. 3 is a schematic block diagram of the detector 300 of FIG. 1 that can implement the processes of the present invention. As shown in FIG. 3, memory 330 configures the processor 320 to implement the denial of service filtering methods, steps, and functions disclosed herein. The memory 330 could be distributed or local and the processor 320 could be distributed or singular. The memory 330 could be implemented as an electrical, magnetic or optical memory, or any combination of these or other types of storage devices. It should be noted that each distributed processor that makes up processor 320 generally contains its own addressable memory space. It should also be noted that some or all of computer system 300 can be incorporated into an application-specific or general-use integrated circuit. As shown in FIG. 3, the exemplary memory 330 includes one or more denial of service detection processes 500, discussed further below in conjunction with FIG. 5.

Figure 4:
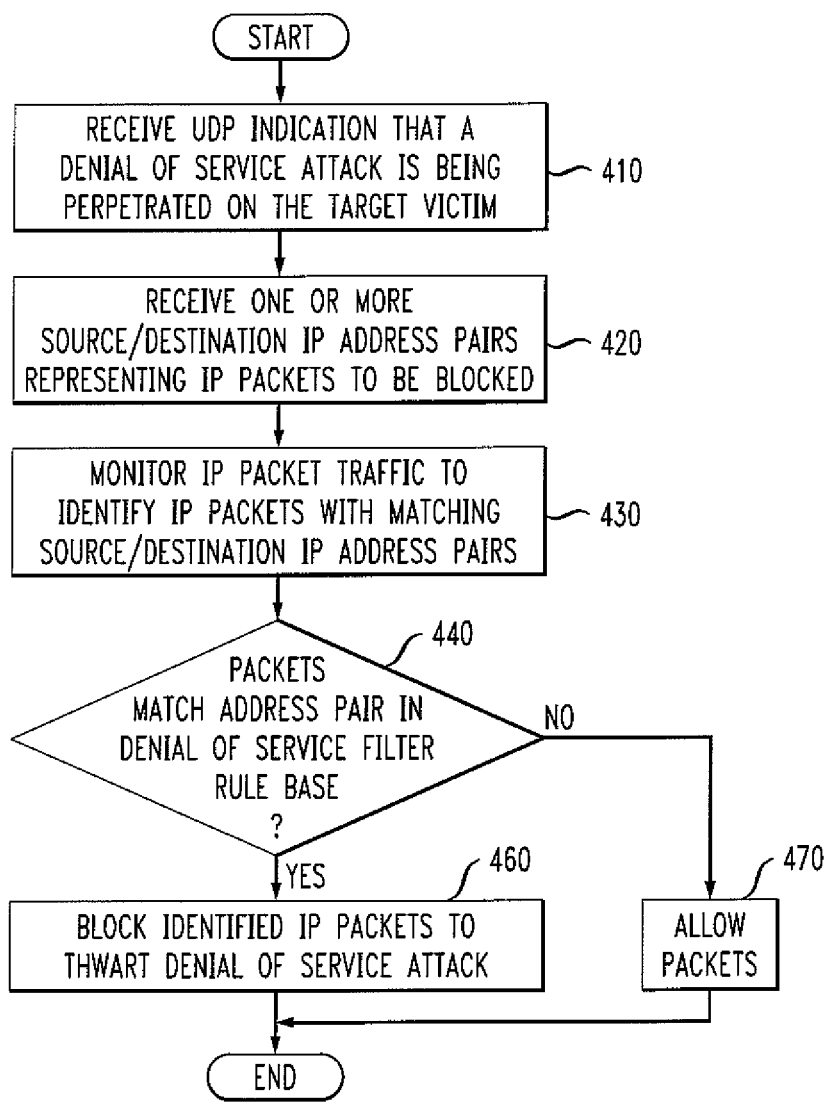
FIGS. 4 and 5 are flow charts describing exemplary implementations of a denial of service filtering process incorporating features of the present invention.

FIG. 4 is a flow chart describing an exemplary implementation of a denial of service filtering process 400 incorporating features of the present invention. It is noted that the exemplary denial of service filtering process 400 is implemented for a "default-allow" mode. An implementation for a "default drop" mode would be readily apparent to a person of ordinary skill in the art. Generally, the denial of service filtering process 400 is an exemplary method for defending against Denial of Service or other attacks in accordance with the present invention. The illustrative denial of service filtering process 400 is performed at the central filter 200 and begins during step 410 by receiving a UDP indication from the detector 300 that a Denial of Service attack is being perpetrated on a given target victim in the enterprise network 150.

Thereafter, during step 420, the network carrier receives one or more source/destination IP address pairs from the detector 300 representative of IP packets that should be blocked in order to thwart the Denial of Service attack. Illustratively, the source IP addresses are those of the attacking (e.g., "zombie") computing devices 110 and the destination IP addresses are those associated with the target victim itself. The messages from the detector 300 are transmitted in accordance with the DP, discussed below.

The network carrier then monitors the IP packet traffic during step 430 to identify IP packets whose source and destination IP addresses match one of the received source/destination IP address pairs. A test is performed during step 440 to determine if one or more packets match an address pair in the denial of service filter rule base 260.

If it is determined during step 440 that one or more packets match an address pair in the denial of service filter rule base 260, then the packets should be dropped or limited during step 460. If it was determined during step 440 that one or more packets do not match an address pair in the denial of service filter rule base 260, then the packets are allowed to be transmitted to the enterprise network 150 during step 470.

Figure 5:
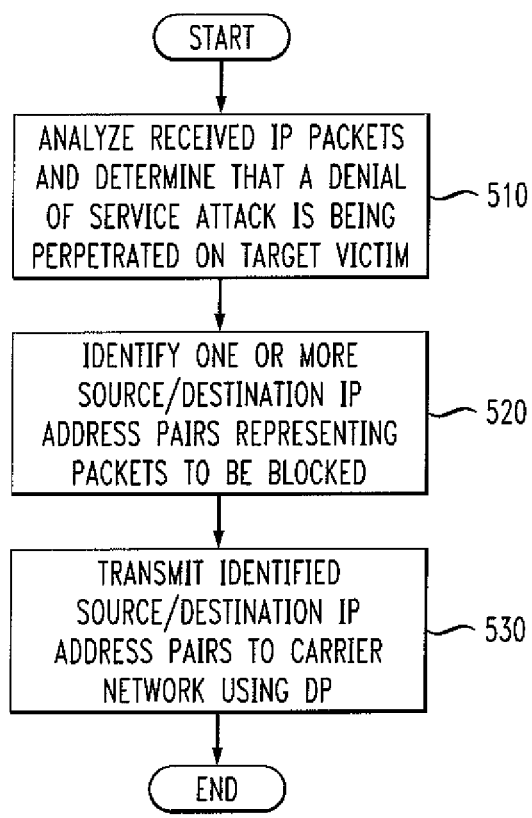

FIG. 5 is a flow chart describing an exemplary implementation of a denial of service detection process 500 incorporating features of the present invention. Generally, the denial of service detection process 500 is an exemplary method for defending against Denial of Service or other attacks in accordance with the present invention. The illustrative denial of service detection process 500 is performed by a detector 300 at a target victim and begins during step 510 by determining that a Denial of Service attack or another malicious attack is being perpetrated thereupon based on an analysis of received IP packets. Then, during step 520, one or more source/destination IP address pairs are identified as being representative of IP packets that should be blocked in order to thwart the Denial of Service attack. (Illustratively, the source IP addresses are those of the attacking "zombie" machines 110 and the destination IP addresses are those associated with the target victim itself.) Finally, during step 530, the identified source/destination IP address pairs are transmitted to the central filter 200 of the victim's carrier network using the disclosed DP to enable the carrier network to block transmission of IP packets having matching source and destination IP addresses.

Denunciation Protocol

In one exemplary implementation, the Denunciation Protocol (DP) communication channel between a detector 300 and the central filter 200 consists of a UDP port for denunciations and a TLS connection for most other communications. DP transactions are of two types. The first, over UDP, consists of a request packet from the detector 300 to the central filter 200, possibly answered by an optional response from the central filter 200. The second, typically over TLSv1, consists of an SSL "record", eventually answered in a corresponding record. Most DP transactions are originated by the detector 300. According to one aspect of the present invention, most DP requests do not require responses or acknowledgements.

The basic DP transaction is a denunciation from the detector 300 to the central filter 200. Each detector 300 speaks on behalf of a "zone," a set of IP addresses that is a subset of the IP addresses owned by the subscriber (enterprise network 150). The detector 300 is said to "belong" to that zone. The detector 300 denounces traffic destined for the zone to which it belongs. (The IP address of the detector 300 itself does not have to be part of the zone to which it belongs.)

All denunciation transactions are originated by the detector 300. Denunciations from the subscriber are likely to be transmitted at a time that the subscriber is least likely to want to receive packets—when it is overloaded. Although it is also possible (or even likely) that the packet loss rate on the path from the subscriber to the central filter 200 may be higher than usual, and that the central filter 200 may be somewhat busier than usual, at that time, too, it is unlikely that the inbound path from the subscriber is as critically overloaded as the path to the subscriber, which is under attack. The path from the subscriber to the central filter 200 is within the service provider's network. Therefore, the disclosed DP tries to avoid launching any traffic towards the subscriber at denunciation time. Thus, denunciations are not sent reliably—no acknowledgement is received from the central filter 200.

Rather, the subscriber preferably sends multiple copies of each denunciation request, rather than have the central filter 200 send even one response. The multiple copies increase the probability that the denunciation request arrives safely at the central filter 200. For example, if five copies are sent, and packets are dropped at random, then even if the packet loss rate is 20% (and drop rates are typically well under 5%) the odds are extremely high that at least one copy of the request will have arrived. With these exemplary figures (a 20% packet loss rate and five copies), assuming that packet transmissions are spread out so that all losses are independent, the odds are still greater than 99.96% that at least one copy gets through.

This same reasoning also warrants making each packet self contained, so as not to depend unnecessarily on packets arriving in order. As previously indicated, DP transactions are generally initiated by the enterprise (through the detector 300), and none by the central filter 200. This is motivated partly by the above described considerations, as well as to maintain a request/response model, in order to be friendlier to firewalls around the enterprise, and increase the likelihood that DP packets can safely get through.

The central filter 200 determines which filter rules are officially installed. A detector 300 merely issues denunciations to the central filter 200. There is no ironclad guarantee that a denunciation will reach the central filter 200. Further, more than one detector 300 can denounce hostile sources for a given zone of destinations. Consequently, a detector 300 cannot know, with certainty, the set of installed filters. It is desirable that the subscriber know which filters actually are installed, which never arrived at the central filter 200, and which have been removed or created by other detectors 300, or due to conflict (see below). To this end, when things calm down somewhat, the subscriber may request a status report from the central filter 200. The status report lists which requests arrived, which filters were installed, and other information (detailed below).

In order to receive the status reliably and bootstrap the authentication, the disclosed DP provides a (reliable) communication channel (TLS) between each detector 300 and central filter 200.

The central filter 200 and each detector 300 must coordinate in order to maintain some shared state. The most obvious shared state is the set of installed filter rules, but there is also other shared state related to DP itself, such as sequence numbers of denunciations and information for authentication. The exemplary embodiment only requires moderately synchronized clocks. To avoid the need to run anything unnecessary on a detector 300 or a central filter 200, the disclosed DP provides very coarse clock "synchronization", so that there is no need to run with a Network Time Protocol (NTP), as discussed below in a section entitled "B. Authentication." Many subscribers will wish to run NTP anyway on the detector 300, to simplify event correlation across the enterprise network (but it is not required for the DP to operate).

For both filter and protocol state, the disclosed DP mandates that the detector 300 and central filter 200 agree, reliably, on an initial shared state, and then both sides keep track of changes to the state as time passes. In case of a discrepancy between a detector 300 and the central filter 200, the central filter 200 always has the "true" picture of the shared state. The amount of filter state to keep synchronized is up to the detector 300 (it may not care about past denunciations at all, and base all of its analysis on the current traffic flow). The protocol state is required by DP.

A detector 300 can re-synchronize filter state with the central filter 200 by means of periodic status requests. Typically, the central filter 200 returns only the filter state changes since the last status request (although it can also return all currently active filters, regardless of when installed, if so requested.) Typically, the central filter 200 returns the filters of all detectors 300 in the zone, but, if requested, it can return only the denunciations requested by this detector 300.

A detector 300 can re-synchronize sequence numbers and authentication keys by means of a synchronize request. In a synchronize transaction, the detector 300 unilaterally chooses a new sequence number and the central filter 200 generates a new session key for authentication.

In the case that a detector 300 crashes, or somehow loses information, the detector 300 can request all filter rules, not just recent ones. At any time, a detector 300 can renegotiate authentication information (see below) for denunciations.

In the event that the central filter 200 resets all filter rules (zone change, mode change, or some fatal DB crash), the central filter 200 deliberately forgets its association with the detector 300, prompting the next detector transaction to return a resynch response from the central filter 200. When the detector 300 resynchronizes with the central filter 200, the central filter 200 can tell the detector 300 that its previous state is no longer valid; it needs to request a full status.

The central filter 200 may receive malformed or unauthenticated packets. In such cases, the central filter 200 returns an error packet to the (legitimate) sender, for example, up to a maximum rate of one error packet every 30 seconds to each host. The rate limit can be set, for example, to avoid attackers from using the Denunciation Protocol to launch a Denial of Service attack.

Conflicting Denunciations

Denunciations can specify several possible different actions in the event of a packet matching a classification. Consequently, conflicts may occur. For example, one detector 300 may specify that an entire subnet seems to be launching web crawlers and should be rate limited. Another detector 300 may detect a particular host in that subnet launching real attacks and specify that all packets from that host should be dropped. In such a case of conflict, the latter rule is unequivocally more specific than the former rule: it refers to a single host, and it says to drop rather than just rate limit the source. In such a conflict, it is reasonable to argue that the stricter rule applies. However, suppose the requested actions were reversed: one detector 300 requests rate limiting on a single source, while another detector 300 requests that all packets from the subnet (including that source) be dropped. One could argue that the former rule is more specific (it refers to a single host, not the whole subnet), or equally well argue that the latter rule is stricter (it says to drop packets, rather than just thin them). The exemplary embodiment adopts the convention that the most specific source address takes priority.

Nevertheless, for clarity, the best practice is for detectors 300 to avoid issuing conflicting rules. It is always possible to retract the existing conflicting rule before issuing a new set. However, given the unreliability of denunciations it is conceivable that the central filter 200 will receive the new rule before discovering that the earlier, conflicting, rule was retracted. Further, given multiple detectors 300 managing the same zone, it is possible that two detectors 300 may independently issue conflicting denunciations without renouncing the conflict.

The behavior of the central filter 200 when encountering conflicts should be specified. In one exemplary implementation, the basic policy is that in the case of conflict (two rules with the same specification of source address, but two different actions or reasons), then the later rules override earlier rules. ("Later" refers to when the rule arrives at Central.)

DP Protocol Algorithms

A. Reliable Transmission

As discussed above, packets should be sent from the detector 300 to the central filter 200, and not sent in the other direction from the central filter 200 to the detector 300. Further, each packet can stand by itself and does not require in-order delivery. Consequently, rather than guaranteeing that each denunciation packet arrive, and arrive in sequence, the disclosed DP opts to probabilistically improve the odds of successful arrival by transmitting multiple copies of each packet. DP denunciation requests are sent in UDP packets to a port on the central filter 200 that is specified, for example, in the response to a SYNCH request. In general, each denunciation packet is sent p times, and an acknowledgment is not required. In one exemplary implementation, p is fixed at 5, and no formal requirements on packet pacing are provided.

For ordering requirements (given the rule that in the case of directly conflicting filter rules where the conflict resolution rules do not choose a clear winner, the latest rule overrides earlier rules), DP sequence numbers are passed up to the application in order to determine the transmission order. The central filter 200 acts as a serializer for denunciations from multiple detectors 300. The requests from a single detector 300 are ordered unambiguously by sequence number. The order of the interleaving is unilaterally decided by the central filter 200. The central filter 200 remembers where, in the global order, each detector 300 last received a status response.

The intent behind sending multiple packets is to ensure that at least one copy of each packet arrives at the central filter 200, not to flood the central filter 200 with packets. Further, attackers should not have a point of leverage with which to launch DoS attacks on the disclosed DP. The central filter 200 should process, on average, one packet per transaction. The requirement that the central filter 200 authenticate each packet, to be certain it was sent by the correct detector 300, means that packet processing may be expensive.

Most redundant packets can be discarded without expensive computations. In one implementation, the cheapest tests are performed first. For example, the sequence number is unencrypted and is computationally cheap to check for denunciation requests. Similarly, it is also cheap to check whether the detector name is known. Duplicate requests and sequence numbers out of range, are easy to discard before performing other tests.

In the disclosed DP, denunciation transactions are initiated by a detector 300 over UDP. The DP maintains a separate TLS connection (over TCP) for other requests.

B. Authentication

The basic authentication mechanism for DP in the exemplary implementation is an authentication handshake provided by TLSv1 with client certificates. The public key of the trusted ISP Certificate Authority is pre-loaded into the central filter 200 and each detector 300. Each detector 300 and the central filter 200 has a certificate for its public key signed by that Certificate Authority (CA). In addition, the subscriber detector 300 is provided with the fully qualified domain name of the central filter 200, which is also the CN part of the server certificate Subject.

The key is associated with the detector's "name", not its IP address, which may change for any number of reasons. As noted below, the DP enforces a maximum of one detector 300 with a given name at any time. Following the standard TLS protocol, the central filter 200 sends a Certificate Request message specifying that it will accept only a certificate signed by the CA. The detector 300 responds with two messages as part of the client authentication process. First, the detector 300 provides a certificate containing the detector's name and the detector's public key. Second, the detector 300 sends a Certificate Verify message containing a digest of all of the TLS handshake messages signed by the detector's private key. The central filter 200 can now authenticate the client as being the detector 300 mentioned in the certificate.

Once the TLSv1 connection is established, the central filter 200 should use this secure encrypted channel to transmit a randomly chosen 160 bit secret nonce to the detector 300 before any denunciations can be issued over UDP.

Every DP denunciation packet is authenticated. In one exemplary embodiment, denunciations in the disclosed DP are authenticated by a cryptographic hash of (a) the UDP packet contents, (b) a time counter (number of "units" since RSTART, where the length of a "unit" and the time of RSTART are established during synchronization), (c) the secret nonce, and (d) the DP port number used by the TLS channel. (b) is a minimal defense against replay attacks, and (c) authenticates the detector 300 to the central filter 200. The MAC function used in the exemplary embodiment is HMAC-SHA1 (see Internet RFC 2104 for details), and the extra fields above are used as the HMAC key.

A 20-bit sequence number can be included inside the packet, and assume that each server sends fewer than $2^{20}$ requests before the unit counter is incremented. Endpoints of DP only accept the first valid packet with a given sequence number. By the time the sequence number wraps around, the unit counter has been incremented to defend against simple replay attacks. The detector 300 includes the low order bit of the number of the unit counter as the high order bit (21st bit) of the sequence numbers. This allows the "date" (number of units since RSTART time) to change on the detector 300 at an arbitrary time with respect to the central filter 200, and the central filter 200 can still figure out what the hidden date is (as long as there is at least one synchronization exchange per "day" [unit]). This allows the need for tightly synchronized clocks to be avoided.

In the unlikely case that the detector 300 attempts to send more than $2^{20}$ packets within a time unit, it should request a new secret nonce from the central filter 200. The detector 300 chooses the length of a unit (expressed as a fraction of a day) to make it unlikely that the sequence number wraps around.

It may seem that computing these cryptographic hashes could be expensive, and the expense can be exacerbated by sending many copies of each packet. However, note that once a given sequence number is received successfully, any duplicates can be discarded without computing the hash. Randomly constructed packets from attackers are unlikely to be accepted, because the window of acceptable sequence numbers is very small compared to the entire sequence number space. The central filter 200 discards packets outside of the expected window. Further windowing can be based on the detector name: detector names can be sparsely allocated—for example, on the order of 100 valid values within a 2 byte field.

If there is a concern that attackers might snoop denunciation requests, copying the detector name, capturing the sequence numbers, and then sending many bad copies of the last packet in the window, a method of fast discard can be provided that is protected against snoopers. In practice it is expected that this extra level of protection will not be necessary—that the cost of performing the SHA1 hash will not be a sufficient bottleneck at the receiver to justify this added complexity. Nevertheless, this Secure Fast Discard method is discussed below.

C. Secure Fast Discard

The Secure Fast Discard method is optional. Space for this optional method is provided in denunciation packets in an exemplary DP version, but this secure fast discard algorithm will not be enabled in DP unless, in practice, it is determined that this protection is needed.

The basic approach is as follows: each denunciation request will include an easy to compute L-bit string $S_L$ (L=5, provisionally, so that the string fits into the padding of the sequence number field). $S_L$ is the result of a simple function of the sequence number and a pair of secret keys provided by the central filter 200 over the SSL channel. It is computationally inexpensive to check whether the packet is invalid—if $S_L$ is not the expected value the packet is discarded. It still requires a check of the cryptographic hash to determine whether the packet is valid—but this happens approximately once per sequence number.

When a detector 300 synchronizes the shared key for the HMAC-SHA1 hash with the central filter 200, the central filter 200 should also provide a string length L, a key length B, a B+L bit string S, and a small integer K, such that $1 \leq K \leq B$. None of these are known to attackers, although L and B may change infrequently, and should not be considered "secret" in the same sense as S and K. For a denunciation request with sequence number s, $S_L$ is the L bit substring in S starting at bit position b. b is a function of s, B, and K. $S_L$ is inserted at the both position in the HMAC-SHA1 hash of the packet (extending the length of the SHA1 hash by L bits).

If L=5, and B=1019, then the pattern won't repeat until roughly 220 denunciation packets—at which time a new nonce must be selected for the HMAC-SHA1 hash in any case. Given that the string $S_L$ will appear to be random to a snooping attacker, the simple check of $S_L$ should thin the stream of attacking packets by a factor of 2L. Choosing larger L, however, increases the odds that an attacker can reconstruct S, and then K—therefore L should be chosen so that $2L2^L < B$ (meaning that L is O(logB)) to avoid this issue (so that every possible L bit substring is likely to appear more than once in S).

D. DP Message Service

The disclosed DP provides a means for the detector 300 and the central filter 200 to send messages reliably to each other. SSL/TLS implements records in the stream. SSL records can be used as DP records, beginning each record with a DP record header simply describing the type of the record (such as STATUS, Message and Status reply). However, in our experience, not all TLS implementations preserve record boundaries in their API to clients (An SSL write (unless the data is too large) produce SSL records, but SSL read can return partial records, or multiple records). Consequently, to provide maximum portability across platforms, an exemplary embodiment of the DP (possibly redundantly) implements its own record marking protocol—within the SSL records. Ideally, one DP record should fit inside each SSL record—but the record protocol will work regardless. DP uses a start-of-record marker to begin the record, and an end-of-record marker to end. Each record begins with a type and a length field. The length field allows avoiding bit/byte-stuffing—it is legal for either start or end record markers to appear within a record. The length field is the number of bytes within the message, not including the header and trailer.

Although start and end markers are 4 byte sequences in the exemplary embodiment, there is no alignment requirement on DP messages. The body of the message can be an arbitrary length—the length does not have to be a multiple of 32 bits (4 bytes). The start and end markers allows record boundaries to be recovered in case the server or client issue a malformed record—you need only search for a sequence [end-of-record][start-of-record] followed by a length field that itself points to an [end-of-record][start-of-record] pair.

E. Packet Formats, Version Numbers, and Compatibility

Modifications to the disclosed DP should be backward compatible. Incompatible modifications to protocol operations that utilize the SSL channel will allocate a new record-type-identifier, rather than reuse an old type with an incompatible format. Incompatible changes to denunciation transactions will require choosing a new DP port number as part of the modified DP specification. DP will detect a non-DP agent at the remote end of a DP channel in one of two ways. The remote end of an SSL connection will either fail to authenticate, or will fail to comply with the DP initial synchronization protocol. If the incompatibility is undetected, for some reason, during SSL connection establishment, then the cryptographic hash will fail for UDP traffic either because the remote end is not a DP, or it is using an incompatible version number for DP in the hash. This obviates the need for a version number or a magic number in the data transmitted by DP over the wire.

Packets and Operations

As previously indicated, the detector 300 communicates with the central filter 200 over a DP channel. A DP channel should be currently established in order for the detector 300 and the central filter 200 to communicate. Each detector 300 is bound to a specific instance of central filter 200. The central filter 200 will not communicate with a detector 300 that is not bound to it. Each detector 300 bound to a given central filter 200 has a numeric "name" used by that central filter 200.

The first step in establishing a DP channel is initiating an SSL/TLS connection from the detector 300 to the central filter 200. The central filter 200 identifies the communicating detector 300 as authentic through the SSL/TLS authentication process. The detector 300 claims to be the name used in the certificate the detector 300 provides to the central filter 200 in a client authentication phase of the TLS handshake. The name should be of a predefined form.

Once the TLS channel is established, the detector 300 must send a synchronization request on the TLS channel. The TLS channel is not considered initialized until a synchronization request is sent from the detector 300 to the central filter 200, and a synchronization acknowledgement is returned from the detector 300 to the central filter 200. The exemplary synchronization request includes, among other values, the sequence number for the next denunciation transaction (the sequence numbers of each denunciation transaction will increase by one until the next synchronization request). It also initializes the length of a "time unit", and the random start time "RSTART". The central filter 200 responds with a synchronization acknowledgement that includes a randomly generated 160 bit session key, and an indication of whether the detector 300 can be satisfied with an incremental filter state, or whether it needs the full filter state.

After this exchange, the detector 300 must establish the Path MTU, and request and receive the first status reply. At this point, the DP channel is established. As described above, there are four basic types of DP transactions: synchronize, denunciation, status query, and message. The first three transaction types (synchronize, denunciation, and status query) are all initiated by the detector 300. However, messages can be sent over the SSL channel in either direction at the request of the detector 300 or central filter 200.

Denunciation transactions are sent over a UDP channel, from a random port on the detector 300 to the DP port on the central filter 200. In the normal case, the central filter 200 sends no response at all. In the case of errors, failures, or potential attack, the central filter 200 can respond with either a resynch or an error packet. These responses are sent over a TLS channel when it is known that the TLS channel still exists. When the TLS channel does not exist, then the response is sent over UDP—in this case it must be a resynch message, to reestablish the TLS channel. The general rule is that if the incoming packet is well-formed, and the central filter 200 believes the client is legitimate, then it sends a resynch message. Otherwise, the central filter 200 sends an error message.

All other transactions utilize the TLS channel.

A. UDP Transactions (Denunciations and Responses)

As previously indicated, the HMAC-SHA1 message authentication is computed over the contents of the packet as well as a key that includes the nonce, the day counter, and the global DP port number. FIG. 6 illustrates the HMAC key for UDP requests, prepended to the UDP packet.

As indicated above, the number of units since RSTART prevents the DP from being the source of DoS attacks.

B. SSL Channel

Figure 7:
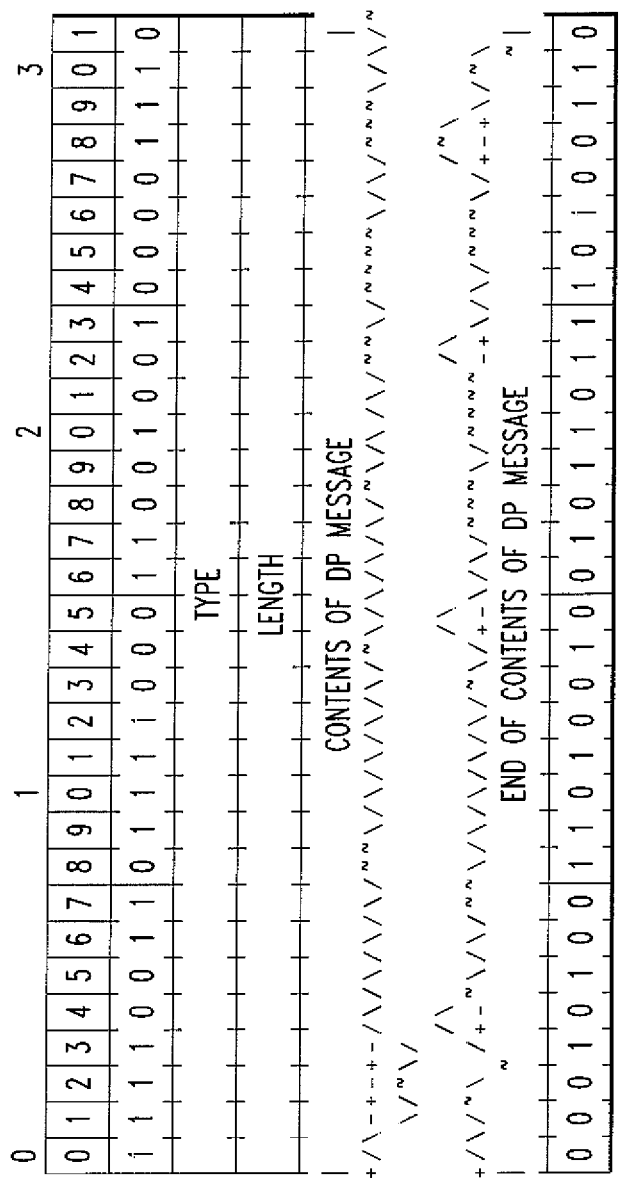
FIG. 7 illustrates an exemplary layout of a DP record header and trailer within the secure reliable stream.

All DP communications that are sent over the TLS channel is broken up into records. In one exemplary embodiment, the maximum size of a single DP record is 16000 bytes. Where the API to the SSL protocol permits, it is a good practice to have exactly one DP record per SSL record. The exemplary DP record begins with, for example, a predefined 4 byte sequence, and ends with another predefined 4 byte sequence. The type of the DP record is encoded (in network byte order) as a 32 bit integer immediately following the start of message marker. The length of the DP record is encoded (in network byte order) as a 32 bit integer immediately following the type. FIG. 7 illustrates an exemplary layout of a DP record header and trailer within the secure reliable stream.

The present invention may work in conjunction with one or more supplementary tools. For example, such tools might include Internet server plug-ins for recognition of leveraged Denial of Service attacks, links to various IDS systems (Intrusion Detection Systems), databases for network diagnosis (see discussion above), and methods for providing guidance for placement of Zapper functionality within a given carrier's infrastructure. Illustrative embodiments of the present invention which provide various ones of these supplementary tools will be obvious to those skilled in the art in light of the disclosure herein.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for defending against unwanted traffic by a target victim, the target victim having one or more destination addresses, the method comprising the steps of:
   determining that unwanted traffic is received by said target victim based on an analysis of packets received from one or more source IP addresses; and
   transmitting a denunciation message to a central filter associated with a service provider, said denunciation message identifying a source address of at least one source computing device whose transmission of packets to said target victim are specified in said denunciation message to be one or more of limited, dropped and allowed and wherein said denunciation message is transmitted using a Denunciation Protocol that does not require a substantially immediate acknowledgement from said central filter, wherein said Denunciation Protocol comprises at least two communication channels, wherein said at least two communication channels comprise a first, substantially secure communication channel and a second communication channel in which the denunciation message is transmitted, wherein the second channel of the Denunciation Protocol does not require said substantially immediate acknowledgement from said central filter.

2. The method of claim 1, wherein said denunciation message comprises one or more source/destination address pairs.

3. The method of claim 1, wherein said unwanted traffic comprises a malicious attack or a Denial of Service attack.

4. The method of claim 1, wherein said denunciation messages are sent redundantly to said central filter.

5. The method of claim 1, wherein said denunciation message is self contained.

6. The method of claim 1, wherein said Denunciation Protocol provides a coarse clock synchronization.

7. The method of claim 1, further comprising the steps of receiving a shared state from said central filter and maintaining any changes to said state.

8. The method of claim 7, further comprising the step of updating said shared state in response to a status request.

9. The method of claim 1, wherein said Denunciation Protocol includes one or more features to avoid a malicious attack aimed at said Denunciation Protocol.

10. The method of claim 1, wherein said denunciation message includes a sequence number.

11. The method of claim 10, wherein said sequence number allows conflicting denunciation messages from a plurality of said target victims to be reconciled.

12. The method of claim 10, wherein said sequence number allows a malicious attack aimed at said Denunciation Protocol to be avoided.

13. The method of claim 10, wherein said sequence number allows duplicate copies of said denunciation message to be discarded.

14. The method of claim 1, further comprising the step of authenticating with said central filter an identity of an originator of said denunciation message.

15. The method of claim 1, wherein said central filter authenticates said denunciation message and associates a zone with said denunciation message based on an identity of an originator of said denunciation message.

16. The method of claim 15, wherein said authentication employs a cryptographic hash based on a content of said denunciation message and a time counter.

17. The method of claim 1, wherein said second communication channel comprises a User Datagram Protocol (UDP) channel.

18. The method of claim 1, wherein the first communication channel comprises a Transport Layer Security (TLS) channel.

19. An apparatus for defending against unwanted traffic by a target victim, the target victim having one or more destination addresses, the apparatus comprising:
   a memory; and
   at least one processor, coupled to the memory, operative to:
   determine that unwanted traffic is received by said target victim based on an analysis of packets received from one or more source IP addresses; and
   transmit a denunciation message to a central filter associated with a service provider, said denunciation message identifying a source address of at least one source computing device whose transmission of packets to said target victim are specified in said denunciation message to be one or more of limited, dropped and allowed and wherein said denunciation message is transmitted using a Denunciation Protocol that does not require a substantially immediate prompt acknowledgement from said central filter, wherein said Denunciation Protocol comprises at least two communication channels,
   wherein said at least two communication channels comprise a first, substantially secure communication channel and a second communication channel in which the denunciation message is transmitted, wherein the second channel of the Denunciation Protocol does not require said substantially immediate acknowledgement from said central filter.

20. The apparatus of claim 19, wherein said denunciation messages are sent redundantly to said central filter.

21. The apparatus of claim 19, wherein said denunciation message is self contained.

22. The apparatus of claim 19, wherein said second communication channel comprises a User Datagram Protocol (UDP) channel.

23. The apparatus of claim 19, wherein the first communication channel comprises a Transport Layer Security (TLS) channel.

24. An article of manufacture for defending against unwanted traffic by a target victim, the target victim having one or more destination addresses, comprising a non-transitory machine readable recording medium containing one or more programs which when executed implement the steps of:
   determining that unwanted traffic is received by said target victim based on an analysis of packets received from one or more source IP addresses; and
   transmitting a denunciation message to a central filter associated with a service provider, said denunciation message identifying a source address of at least one source computing device whose transmission of packets to said target victim are specified in said denunciation message to be one or more of limited, dropped and allowed and wherein said denunciation message is transmitted using a Denunciation Protocol that does not require a substantially immediate acknowledgement from said central filter, wherein said Denunciation Protocol comprises at least two communication channels, wherein said at least two communication channels comprise a first, substantially secure communication channel and a second communication channel in which the denunciation message is transmitted, wherein the second channel of the Denunciation Protocol does not require said substantially immediate acknowledgement from said central filter.

* * * * *

UNITED STATES PATENT AND TRADEMARK OFFICE
CERTIFICATE OF CORRECTION

PATENT NO. : 8,914,885 B2  
APPLICATION NO. : 11/592726  
DATED : December 16, 2014  
INVENTOR(S) : Michael B. Greenwald et al.

Page 1 of 1

It is certified that error appears in the above-identified patent and that said Letters Patent is hereby corrected as shown below:

Specification

Column 8, line 56, replace "requested.)" with --requested).--.

Column 9, line 41, replace "denunciations it is" with --denunciations, it is--.

Column 9, line 43, replace "earlier, conflicting, rule" with --earlier conflicting rule--.

Column 12, line 4, replace "I$\leq$K$\leq$B" with --L$\leq$K$\leq$B--.

Column 12, line 49, replace "markers allows" with --markers allow--.

Claims

In Claim 19, line 21, replace "immediate prompt acknowledgement" with --immediate acknowledgement--.

Signed and Sealed this
Fifth Day of April, 2016

Michelle K. Lee
*Director of the United States Patent and Trademark Office*